United States Patent [19]

Spodig

[11] 4,236,632
[45] Dec. 2, 1980

[54] MAGNETIC CONVEYOR BELT

[76] Inventor: Heinrich Spodig, Netteberge 84, 4711 Bork, Fed. Rep. of Germany

[21] Appl. No.: 755,205

[22] Filed: Dec. 29, 1976

Related U.S. Application Data

[63] Continuation of Ser. No. 458,351, Apr. 5, 1974, abandoned.

[30] Foreign Application Priority Data

Apr. 14, 1973 [DE] Fed. Rep. of Germany ....... 2318900

[51] Int. Cl.³ ............................................. B65G 15/58
[52] U.S. Cl. ................................................... 198/690
[58] Field of Search ........................ 198/690; 271/193; 214/605, 8.5 D; 414/74, 75, 122

[56] References Cited
U.S. PATENT DOCUMENTS

| | | | |
|---|---|---|---|
| 3,338,374 | 8/1967 | Dudley | 198/690 |
| 3,523,602 | 8/1970 | Mujden et al. | 198/690 |

*Primary Examiner*—Joseph E. Valenza
*Attorney, Agent, or Firm*—Kenyon & Kenyon

[57] ABSTRACT

An improved magnetic conveyor belt in which the belt support is a U-shaped iron rail having a plurality of permanent magnets disposed in the middle of its web between the two legs of the U with the spaces remaining between the magnets themselves and between the magnets and the legs of the rail filled to the level of the permanent magnets with a material which is magnetically non-conductive, thus completely filling in a portion of the U-shaped rail to a predetermined level upon which surface the conveyor rides either directly or through a metal sheet interposed between the top of the magnets and insulating material and the belt whereby the legs of the iron rail will be polarized in one direction and the center portion above the other pole of the magnets polarized in the other direction resulting in a magnetic field extending over a large volumetric space thereby permitting bulkier objects to be reliably carried on the conveyor belt.

11 Claims, 5 Drawing Figures

U.S. Patent     Dec. 2, 1980     4,236,632
FIG. 1
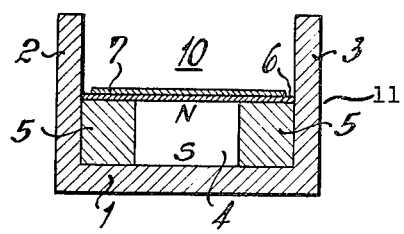
FIG. 2
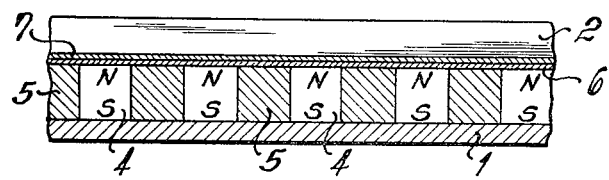
FIG. 3       FIG. 4
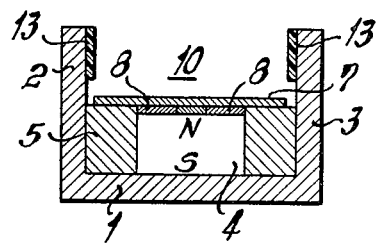 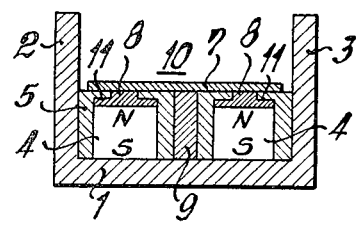
FIG. 5
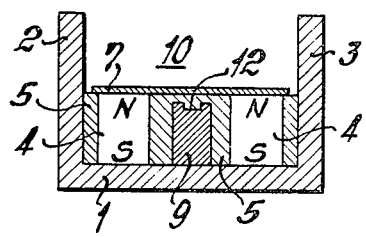

MAGNETIC CONVEYOR BELT

This is a continuation of application Ser. No. 458,351 filed Apr. 5, 1974, now abandoned.

BACKGROUND OF THE INVENTION

This invention relates to magnetic conveyor belts in general and more particularly to an improved conveyor belt which permits reliably carrying objects whose main bulk does not lie in the plane of the conveyor belt.

One typical type of magnetic conveyor belt used in the prior art had disposed and spaced apart, in the belt supporting structure, two rail-like magnetic poles. These are poles of opposite polarity resulting in a magnetic field running therebetween and near the center of the belt. This type of arrangement has two disadvantages. In the first place, the magnetic field is concentrated in the center of the belt and secondary it is concentrated primarily in the plane of the belt. Another type of magnetic conveyor belt overcomes the first of these problems. In that known arrangement, the belt support comprises two side rails and a connecting plate with magnets fastened to the connecting plate having common pole rails situated between the flanges of the side rails. From a magnetic point of view, this construction differs from the first construction described above in that the belt support constitutes a portion of the magnetic field and consequently the magnetic field is distributed over the entire width of the conveyor surface and is not concentrated in the middle. However, this does not overcome the speed problem mentioned above. That is, the magnetic field is still concentrated in the plane of the belt. It is clear that in both of these previously known embodiments, the magnetic field is concentrated in the plane of the belt. As a result, articles which have the major portion of their mass lying in the plane of the belt such as pieces of flat iron will be strongly attracted by the magnetic field and will be securely held to the belt during conveyance. On the otherhand, articles having a bulk which lies primarily outside the plane of the belt will have the major portion of their mass outside the magnetic field and will not be so strongly attracted to the conveyor belt. As a result, these prior art conveyor belts are limited as to the types of objects which can be reliably transported.

It can thus be seen that there is a need for an improved type of magnetic conveyor belt which permits carrying different types of objects including flat objects and bulky objects in a manner such that they are firmly held in place on the belt.

SUMMARY OF THE INVENTION

The magnetic conveyor belt of the present invention provides such an arrangement. It permits carrying objects of varying bulk and shape in a reliable manner with strong magnetic attraction forces present under varying conditions and with various types of objects. This is accomplished in the present invention through the use of a U-shaped iron rail as a belt supporting structure. Upon the web of the U-shaped iron rail, a plurality of permanent magnets with like magnetic poles are arranged in a spaced manner along the length of the rail. The size of the magnets is such that the free pole, i.e., the pole which is away from the bottom web portion of the U-shaped rail is below the top of the legs of the U. In the preferred embodiment, these magnets are of a width which is less than the width of the web, thereby leaving a space between the sides of the magnet and the extending legs of the U. These intermediate spaces are filled, up to the height of the magnet, i.e., up to the face of its free pole, with a material which is not magnetically conductive. After filling with this non-magnetic material, a plane surface, the top of which is defined by the end faces of the free poles of the magnets and the filled in material exists between the legs of the U. This plane surface is the surface upon which the conveyor belt slides. Alternatively, a non-magnetic metal sheet may be placed atop this plane surface, upon which metal sheet the conveyor belt may then slide.

In a preferred embodiment of the invention, there is further included along the length of the conveyor belt arrangement, a common pole rail. This common pole rail lies over the free poles of the plurality of magnets spaced along the length of the conveyor and thus forms a common pole over the full conveyor length. The legs of the U-shaped rail will have a magnetic polarity the same as that of the magnet pole which is in contact with the base or web portion of the U. Between these poles at the legs and the common pole extending along the center of the conveyor belt arrangement, a strong magnetic field of force is developed. Also, because of the arrangement, this magnetic field of force is concentrated primarily within the space between the two legs with a very small magnetic field existing on the outside of the legs. An article being conveyed by the conveyor belt will be strongly attracted by the common pole rail which has a stronger attraction force than the poles at the legs. The objects resting on the belt will have the lines of the magnetic field concentrated therein and will thus act as an extension of the pole of the common pole rail. As a result, the open space through which the magnetic lines of flux must flow in free air is shortened considerably depending on the size and bulk of the objects being carried. As a result, supplementary holding of the articles being conveyed by the effect of the opposite poles at the legs is obtained. Because of this, the larger the size of conveyed items, the greater will be the lines force concentrated in the items and the greater the attraction effect toward the legs of the rail.

Various modifications of this basic embodiment are illustrated including embodiments in which two sets of permanent magnets are arranged along the length of the conveyor thereby resulting in two areas of large concentration of magnetic force.

BRIEF DESCRIPTION OF THE DRAWINGS

FIG. 1 is a cross sectional view through a conveyor belt arrangement of the present invention.

FIG. 2 is a lengthwise cross sectional view of the conveyor belt of FIG. 1.

FIG. 3 is a cross sectional view similar to FIG. 1 or a modified form of conveyor belt.

FIG. 4 is a similar view showing an arrangement wherein two rows of magnets are employed.

FIG. 5 is a similar view showing a further modified form of construction.

DETAILED DESCRIPTION OF THE PREFERRED EMBODIMENT

FIGS. 1 and 2 illustrate the basic construction of a conveyor belt according to the present invention. As illustrated, the main belt support comprises a U-shaped iron rail made up of a web or base section 1 and side legs 2 and 3. The overall rail is designated generally as 11. The rail 11 extends along the entire length of the conveyor arrangement. In conventional fashion, at each of its two ends, a reversing roller will be installed for carrying the belt in an endless path. At least the reversing roller at the output end of the conveyor belt will be magnetic so that items conveyed on the belt may be reliably forwarded over the reversing roller. With the U-shaped rail 11, are installed a plurality of permanent magnets 4. These magnets are arranged over the full length of the rail 11 approximately at its center. As illustrated by FIG. 2, the magnets are spaced apart from each other with the same pole of each magnet in contact with the web 1 of the rail 11. As also illustrated, the width of the permanent magnets 4 is less than the full space between the legs 2 and 3. The remaining space between the magnets 4 and the sides 2 and 3 along with the space between the magnets 4 is filled with a material 5 which is non-magnetic. The non-magnetic material 5 is filled in so as to form a plane surface at the level of the tops of the magnets 5. On top of the plane surface so formed, the conveyor belt 7 slides either directly or on a non-magnetic metal sheet 6 placed intermediate to the top of the magnets and the belt 7. The magnetic poles resting on the web 1, which in the illustrated embodiment are south poles, are extended through the U-shaped rail to the sides 2 and 3 so that the sides 2 and 3 will each act as a south pole with respect to the free north pole below the conveyor belt 7. As a result, in the space 10 between the legs 2 and 3, there is a spatially acting magnetic field. That is, the magnetic field extends not only in the plane of the conveyor belt but acts over a large volume of the space 10.

As shown on FIG. 3, the free poles, i.e., the north poles in FIGS. 1 and 2 may be provided with at least one common pole rail 8 extending over the full length of the arrangement thereby resulting in a common north pole over the full conveyor length. In this embodiment, two pole rails 8 are installed with the unoccupied space therebetween filled with a non-magnetic material.

In order to prevent the articles being conveyed by the conveyor belt 7 from coming into direct magnetic contact with the legs 2 and 3, these legs may be covered on the inside with a coating 13 of a material such as a synthetic material which is not magnetically conductive.

A further embodiment of the invention is illustrated by FIG. 4. In the embodiment thereon, two sets of permanent magnets 4 are installed, one set located on each side of a magnetic metal vertical member 9 which is either secured to the base of the rail 11 or alternatively directly cast as a portion of the rail. Again, the intermediate spaces between the magnets 4 and the sides 2 and 3 and the member 9 are filled in with non-magnetic material 5. Associated with each of the sets of magnets 4 is a pole rail 8. However, unlike the pole rails 8 of FIG. 3, the surface of each rail 8 in FIG. 4 is provided with cutouts 11. As a result, at the top surface, the magnetic field becomes concentrated in a smaller area. Thus, in this arrangement, there are two areas of primary magnetic attraction, one on each side of the conveyor belt 7. It should be noted that the rails 8 of FIG. 3 can be configured in similar fashion. In this embodiment, the member 9 is shown as being of constant cross section over its full height. However, this member could be configured with a cutout 12 such as that shown in FIG. 5 resulting in two areas of concentration at the member 9 which cooperate with the two concentrated areas of the rail 8 in defining the magnetic field therebetween.

The embodiment of FIG. 5 is a modification of the embodiment shown on FIG. 4. The major difference is that the rails 8 shown on FIG. 4 are not present but instead the member 9 is formed with a cutout 12. As a result, the magnetic lines of force are concentrated in the two projections remaining. That is, lines of force extend from the left hand magnet 4 to one of the projecting ends and from the right hand magnet 4 to the other projecting end. This results in a slightly different type of magnetic force concentration than that in FIG. 4. As noted above, the cutouts 12 in the member 9 and the cutouts 11 in the rails 8 may be used together.

The thing to note about the arrangements of FIGS. 4 and 5 is that, as compared to the systems of FIGS. 2 and 3 where the magnetic lines of force extend in the intermediate space 10 from the free magnetic north pole uniformerly to the side legs 2 and 3, in this embodiment, magnetic fields are directed not only to the side legs but to the member 9. That is, the magnet 4 on the right hand side will have a magnetic field extending to the leg 2 and to the member 9. As a result, a more even distribution of magnetic lines of force over the full width of the belt occurs. Furthermore, because there are two concentrated areas of magnetic force, i.e., the areas directly above the rails 8, it is possible to have a division between the two sides of the belt with the belt acting as a multi-belt conveying length.

In each of the above described constructions, the magnetic attraction is concentrated opposite the free magnetic poles, i.e., the north poles shown on the figures. As a result, the magnetic field is concentrated exclusively within the intermediate space 10. The items which are being conveyed tend to align themselves with the magnetic poles being held in place by large attraction forces and can thus be conveyed by the conveyor belt 7. As noted above, the magnetic lines of force are conducted through the items to the south poles formed at the legs 2 and 3 (and at member 9). As a result, over the shortened spacing which then results between the free north poles and which are extended through the items being conveyed and the south poles existing at the legs, a magnetic field influencing their attraction is formed.

Typical items of large bulk which are conveyed on such conveyor belts will comprise boxes or the like. These may be placed with their bottom up on the conveyor belt or else lying on the conveyor belt. In each case, the boxes are situated within a three-dimensional field which leads to the reinforcement of the magnetic attraction forces. With the arrangement of the present invention, it is possible to convey not only boxes which are filled but also empty boxes.

From the various modifications shown above, it is evident that various combinations of the embodiments illustrated may be used. Thus, an improved magnetic conveyor belt which provides a spatially magnetic field within the intermediate space between two legs of a U-shaped rail forming the support for the conveyor belts system thereby improving the magnetic attraction of large bulky articles has been shown. Although specific embodiments have been illustrated and described, it will be obvious to those skilled in the art that various modifications may be made without departing from the spirit of the invention which is intended to be limited solely by the appended claims.

What is claimed is:

1. A magnetic conveyor belt comprising:

(a) a belt supporting structure comprising a magnetically conductive iron rail of U-shaped cross section having a base web portion and first and second side legs;

(b) a plurality of permanent magnets disposed along the length of said rail in spaced fashion with the same pole of each magnet resting against the web of said iron rail;

(c) means supporting a conveyor belt for travel directly above the top surface of said permanent magnets at which surface the other pole of each of said magnets is present; and (d) the top of said conveyor belt being substantially below the height of said side legs of said U-shaped iron rail to result in a magnetic field extending over a large volumetric space between said side legs and said top surface, in which space objects being carried on the belt will be located, to thereby result in magnetic lines of force intersecting objects carried on said conveyor belt thereby permitting bulky objects to be reliably carried.

2. A magnetic conveyor belt according to claim 1 and further including a non-magnetic covering on the inside of said legs.

3. A magnetic conveyor belt according to claim 1 wherein the width of said magnets is less than the lateral spacing between said legs, said permanent magnets being arranged substantially along the center line of said rail in a spaced manner and wherein said means supporting said conveyor belt comprises a non-magnetic metal sheet placed over the free ends of said magnets.

4. A magnetic conveyor belt according to claim 3 wherein the spaces between the magnets and between the magnets and said legs are filled with a non-magnetic material up to the height of said magnets.

5. A magnetic conveyor belt according to claim 1 wherein the spaces between the magnets themselves and between the magnets and side legs are filled in with a non-magnetic material to the height of the magnets thereby forming a plane surface within the space between said legs, and wherein said plane surface forms the support for said conveyor belt.

6. A magnetic conveyor belt according to claim 5 and further including at least one common pole rail extending over the full length of said conveyor belt arrangement.

7. A magnetic conveyor belt according to claim 1 and further including at least one common pole rail extending over the full length of said conveyor belt arrangement.

8. A magnetic conveyor belt according to claim 7 and further including cutouts in said pole rail to result in a narrower portion at the top of said rail.

9. A magnetic conveyor belt according to claim 1 and further including a vertically extending member in the middle of said H-shaped rail said member being of a magnetic material; and wherein two rows of magnets are provided in spaced manner along the length of said rail, one row being placed on each side of said web.

10. A magnetic conveyor belt as in claim 9 where said magnets do not completely fill the spaces between said legs and said vertical member and further including non-magnetic material filling the remaining space to the level of the top of said magnets.

11. A magnetic conveyor belt according to claim 9 and further including cutouts in said vertical member.

* * * * *

UNITED STATES PATENT AND TRADEMARK OFFICE
CERTIFICATE OF CORRECTION

PATENT NO. : 4,236,632
DATED : Dec. 2, 1980
INVENTOR(S) : Heinrich Spodig

It is certified that error appears in the above-identified patent and that said Letters Patent are hereby corrected as shown below:

Col. 1, line 19 -- change "secondary" to --secondly--.

Col. 1, line 32 -- change "speed" to --second--.

Col. 2, line 54 -- change "or" to --of--.

Col. 3, line 55 -- after "each" insert --pole--.

Col. 6, line 23 -- change "H-shaped" to --U-shaped--.

Signed and Sealed this

Seventeenth Day of March 1981

[SEAL]

Attest:

RENE D. TEGTMEYER

Attesting Officer

Acting Commissioner of Patents and Trademarks